United States Patent [19]
Lang et al.

[11] Patent Number: 5,889,840
[45] Date of Patent: Mar. 30, 1999

[54] VOICE MAIL REPLY COMMAND SYSTEM

[75] Inventors: Michael S. Lang, Reston, Va.; Louis H. Weiss, New York, N.Y.

[73] Assignees: Sony Corporation, Tokyo, Japan; Sony Corporation of America, Park Ridge, N.J.

[21] Appl. No.: 831,179

[22] Filed: Apr. 2, 1997

[51] Int. Cl.$^6$ .................................................. H04M 1/66
[52] U.S. Cl. ................................. 379/88.12; 379/88.23; 379/88.25
[58] Field of Search .................... 379/67, 72, 79, 379/80, 89, 88, 88.08, 88.12, 88.22, 88.23, 88.25, 88.26

[56] References Cited

U.S. PATENT DOCUMENTS

| | | | |
|---|---|---|---|
| 4,079,200 | 3/1978 | Meri | 379/80 |
| 4,747,125 | 5/1988 | Buchberger et al. | 379/67 |
| 5,457,732 | 10/1995 | Goldberg | 379/89 |
| 5,519,766 | 5/1996 | Jones | 379/74 |
| 5,661,782 | 8/1997 | Bartholomew et al. | 379/67 |
| 5,703,937 | 12/1997 | Salzman | 379/88 |

*Primary Examiner*—Daniel S. Hunter
*Attorney, Agent, or Firm*—Jay H. Maioli

[57] ABSTRACT

A method for use in a voice mail reply apparatus having first and second memories for storing audio information, including the steps of storing a voice mail message in the first memory, starting the playback of the voice mail message from the first memory and simultaneously storing the voice mail message in the second memory while the voice mail message is being played back, interrupting the playback of the voice mail message from the first memory, recording a response in the second memory, and sending the voice mail message and the response stored in the second memory to the voice mail originator.

4 Claims, 3 Drawing Sheets

VOICE MAIL REPLY COMMAND SYSTEM

BACKGROUND OF THE INVENTION

The present invention relates to a voice mail reply command system for use in office voice mail systems and personal telephone answering machines. More particularly, the voice mail reply command system is useful in circumstances where the person leaving the message asks a series of questions, and the person receiving the message wants to answer during the message playback.

Currently, there are a variety of systems for recording telephone messages when a telephone call is not answered. These systems include voice mail systems used primarily in offices, and telephone answering machines used primarily by individuals in their homes.

Telephone answering machines originally used analog cassette tapes to record messages but with the progress of digital technology many now use digital solid-state memories. These digital telephone answering machines allow their designers to be more creative by including the date and time the message was received ("date and time stamp") and allowing the user to delete selected messages without disturbing others, for example.

Recently, devices and systems that can find out the telephone number of the caller have been developed and are available in most areas in the United States. These systems are known as "caller ID" systems and can be used to store the telephone number of the caller.

When a user receives a message it is common for the message to have several questions or segments that require comment. Currently, the person receiving the message must manually take notes and initiate a second call to respond to the call, thereby making the process cumbersome, time consuming, and inefficient.

OBJECTS AND SUMMARY OF THE INVENTION

The present invention is intended to overcome the above problems and consists of a method for allowing the voice mail message to be interrupted during playback, for recording responses to the voice mail message, and at the conclusion to send the responses back to the caller.

Accordingly, it is an object of the present invention to provide a system to improve the efficiency of replying to telephone messages.

In accordance with an aspect of the present invention, a method for use in a voice mail reply apparatus includes the steps of starting the playback of a voice mail message, interrupting the playback of the voice mail message, recording a response to the voice mail message, repeating the steps of interrupting and recording a response until the entire voice mail message has been played back, and sending the recorded responses to the voice mail message originator.

In accordance with another aspect of the present invention a method for use in a voice mail reply apparatus having a first and a second memory for storing audio information, includes the steps of storing a voice mail message in the first memory, starting the playback of the voice mail message from the first memory and simultaneously storing the voice mail message in the second memory while the voice mail message is being played back, interrupting the playback of the voice mail message from the first memory, recording a response in the second memory, and sending the voice mail message and the response stored in the second memory to the voice mail originator.

In accordance with a further aspect of the present invention the step of sending the voice mail message and the response further includes sending an introduction message with identification information relating to the voice mail message.

The above and other objects, advantages, and features of the present invention will become apparent to those skilled in the art upon consideration of the following description of the present invention.

DETAILED DESCRIPTION OF THE INVENTION

Figure 1:
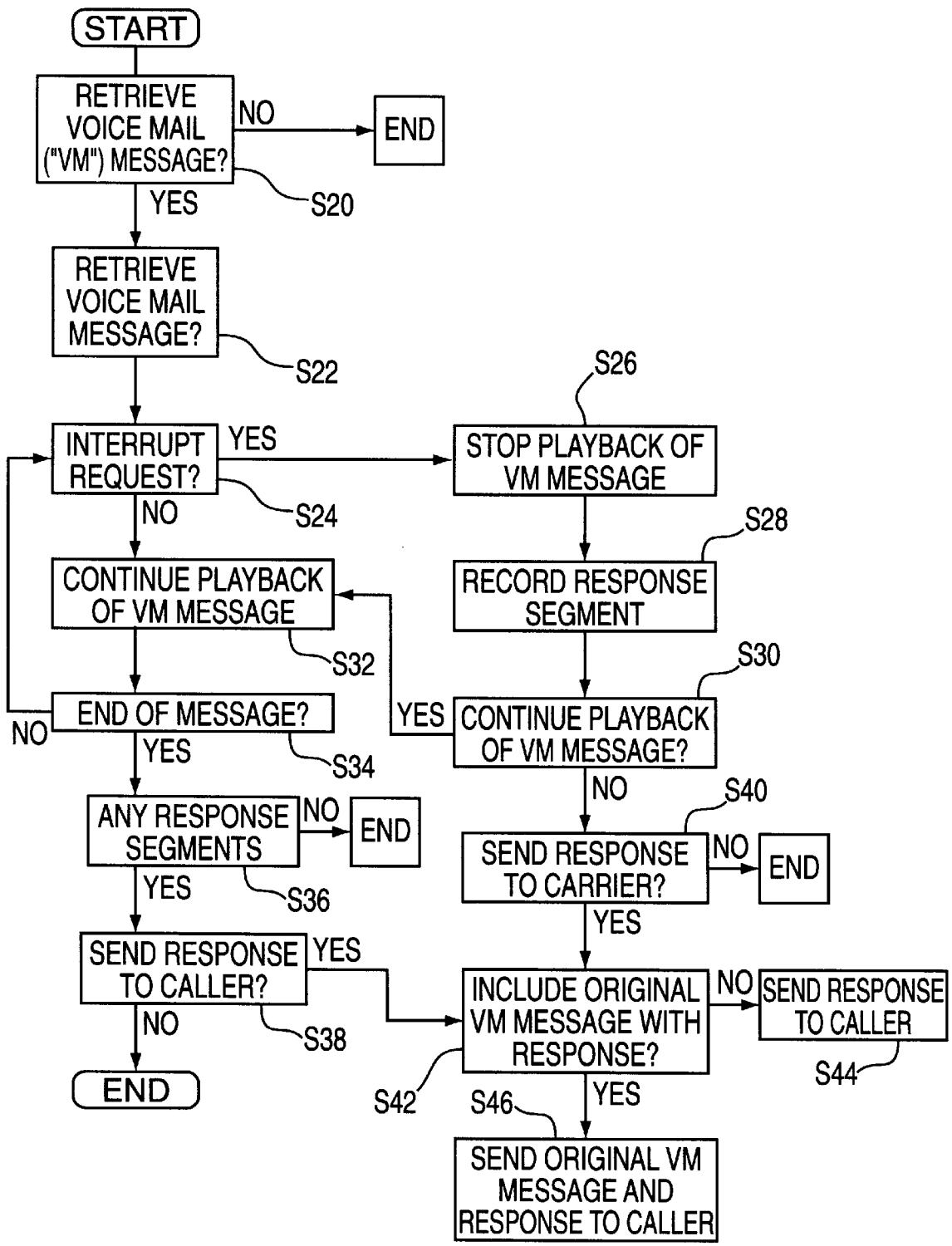
FIG. 1 is an schematic in block diagram form showing a method for use in a voice mail reply apparatus according to a first embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Turning now to FIG. 1, a method for use in a voice mail reply apparatus according to a first embodiment of the present invention will be described. In step S20 the user decides whether to retrieve a voice mail message, if the answer is yes the method proceeds to step S22 where the voice mail message playback is started. Next, if an interrupt is requested during playback as shown in step S24, the playback of the voice mail message is stopped at step S26, and a response is recorded at step S28. Then, the option of continuing the playback of the voice mail message is given at step S30, if playback is chosen the playback continues at step S32 until the voice mail message ends at step S34 with no further interrupts requested. If the user decides not to continue playing back the voice mail message at step S30, the user is asked whether to send the recorded response to the caller at step S40. If the answer is yes, the option of including the original voice mail message with the response is given at step S42 resulting in sending only the response to the caller at step S44, or sending the original voice mail message with the response to the caller at step S46. When the end of the voice mail message is reached at step S34, an inquiry is made at step S36 to check whether there are any response segments, if this is the case, the user is asked whether to send the recorded response to the caller at step S38 and the method proceeds to step S42, resulting in sending only the response to the caller at step S44, or sending the original voice mail message with the response to the caller at step S46.

Figure 2:
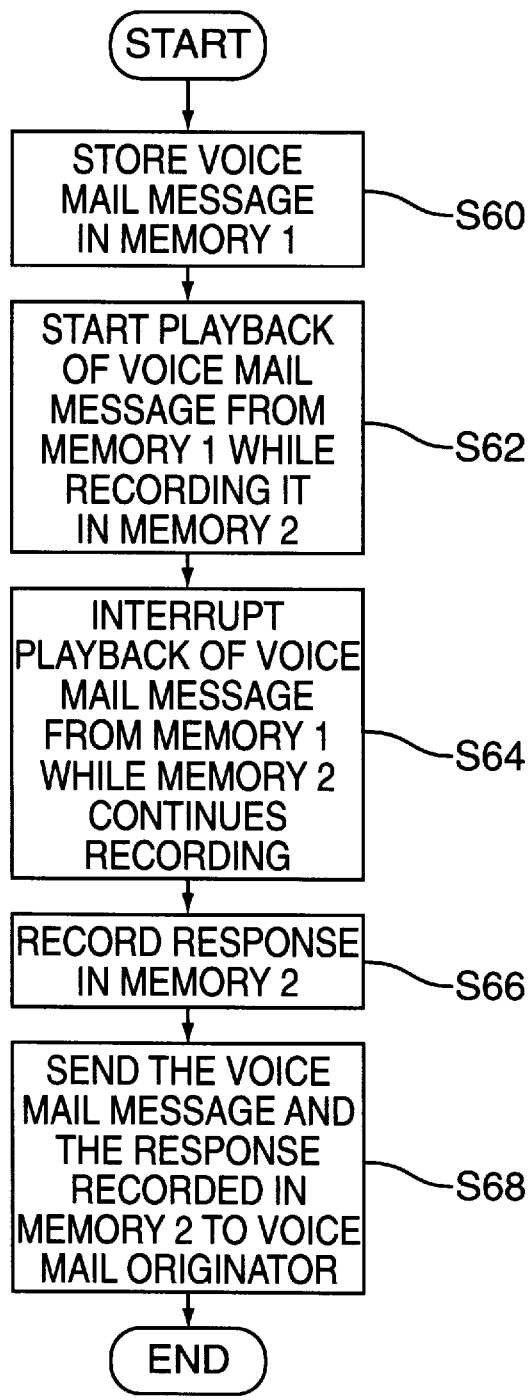
FIG. 2 is an schematic in block diagram form showing a method for use in a voice mail reply apparatus according to a second embodiment of the present invention.

Turning now to FIG. 2, a method for use in a voice mail reply apparatus according to a second embodiment of the present invention will be described. The method according to this embodiment utilizes an apparatus with two memories. Using two memories has the advantage of being able to store the message and the response in the second memory for future sending while the first memory can be erased or used to store new incoming messages. The method starts by storing a voice mail message in memory 1 at step S60, then proceeds to playing back the voice mail message stored in memory 1 while simultaneously recording it in memory 2 at step S62. When a user interrupt is requested, the playback of the voice mail message from memory 1 is stopped, while memory 2 continues recording at step S64. While memory 2 continues recording, a response is recorded at step S66. Finally, the message and the response recorded in memory 2 is sent to the voice mail originator at step S68.

Figure 3:
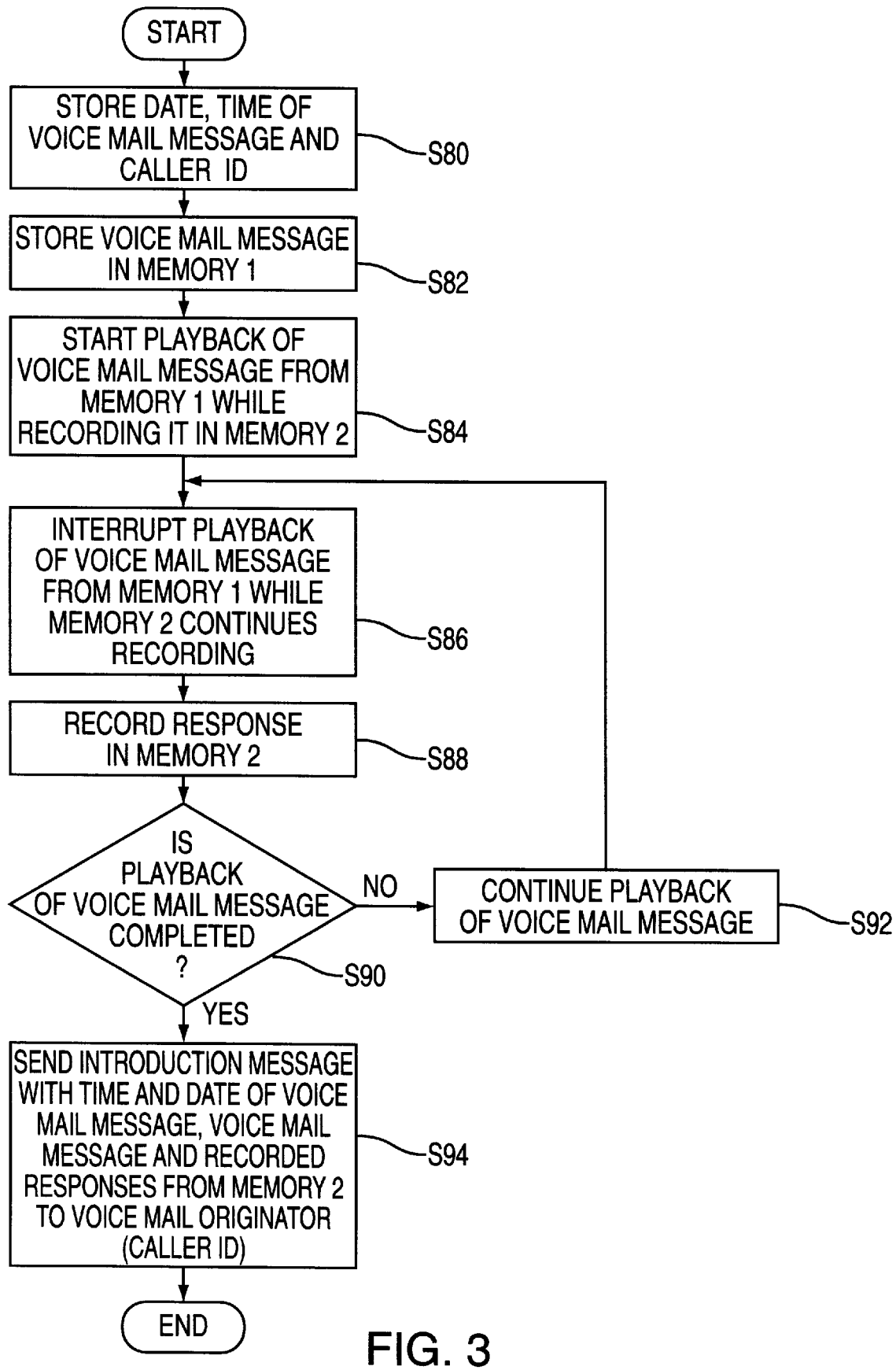
FIG. 3 is an schematic in block diagram form showing a method for use in a voice mail reply apparatus according to a third embodiment of the present invention.

Turning now to FIG. 3, a method for use in a voice mail reply apparatus according to a third embodiment of the present invention will be described. The method starts by storing the date, time and caller ID telephone number when an incoming message is received at step S80. Then proceeds to store the voice mail message in memory 1 at step S82, followed by playing back the voice mail message stored in memory 1, while simultaneously recording it in memory 2 at step S84. When a user interrupt is requested, the playback of the voice mail message from memory 1 is stopped while memory 2 continues recording at step S86. While memory 2 continues recording, a response is recorded at step S88. If the playback of the voice mail message is not completed at step S90, then the playback of the voice mail message is continued at step S92, and steps S86 and S88 are repeated as necessary. If the playback of the voice mail message is completed at step S90, the method proceeds to step S94 where an introduction message including the time and date of the voice mail message is appended to the voice mail message along with the recorded responses and sent to the voice mail originator caller ID number. An example of an introduction message is "This is a response to your call on [insert date] at [insert time] . . ." .

The above description is based on three particular embodiments of the invention, but it will be apparent that many modifications and variations could be effected by one skilled in the art without departing from the spirit of the invention. For example, the method could be used in a personal answering machine instead of a voice mail system.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. A method for use by a called party in a voice mail reply apparatus, comprising the steps of:

receiving and recording a voice mail message sent by a voice mail message originator corresponding to a calling party;

starting the playback to the called party of the voice mail message;

interrupting, by the called party, the playback of the voice mail message;

recording a called-party response to the voice mail message;

repeating the steps of interrupting and recording a called-party response until the entire voice mail message has been played back; and sending the responses recorded by the called Party to the voice mail message originator, along with identification information relating to the voice mail message of the calling party.

2. The method according to claim 1, wherein the step of sending further includes, sending the voice mail message along with the recorded responses.

3. A method for use in a voice mail reply apparatus, wherein the apparatus includes a first and a second memory for storing audio information, comprising the steps of:

storing a voice mail message in the first memory;

starting the playback of the voice mail message from the first memory and simultaneously storing the voice mail message in the second memory while the voice mail message is being played back;

interrupting the playback of the voice mail message from the first memory;

recording a response in the second memory; and sending the voice mail message and the response stored in the second memory to the voice mail originator.

4. The method according to claim 3, wherein the step of sending the voice mail message and the response further includes an introduction message with identification information relating to the voice mail message.

\* \* \* \* \*